May 9, 1967  H. REMY ETAL  3,319,129
ELECTRICALLY IGNITED LIGHTER
Filed Aug. 23, 1966  5 Sheets-Sheet 5

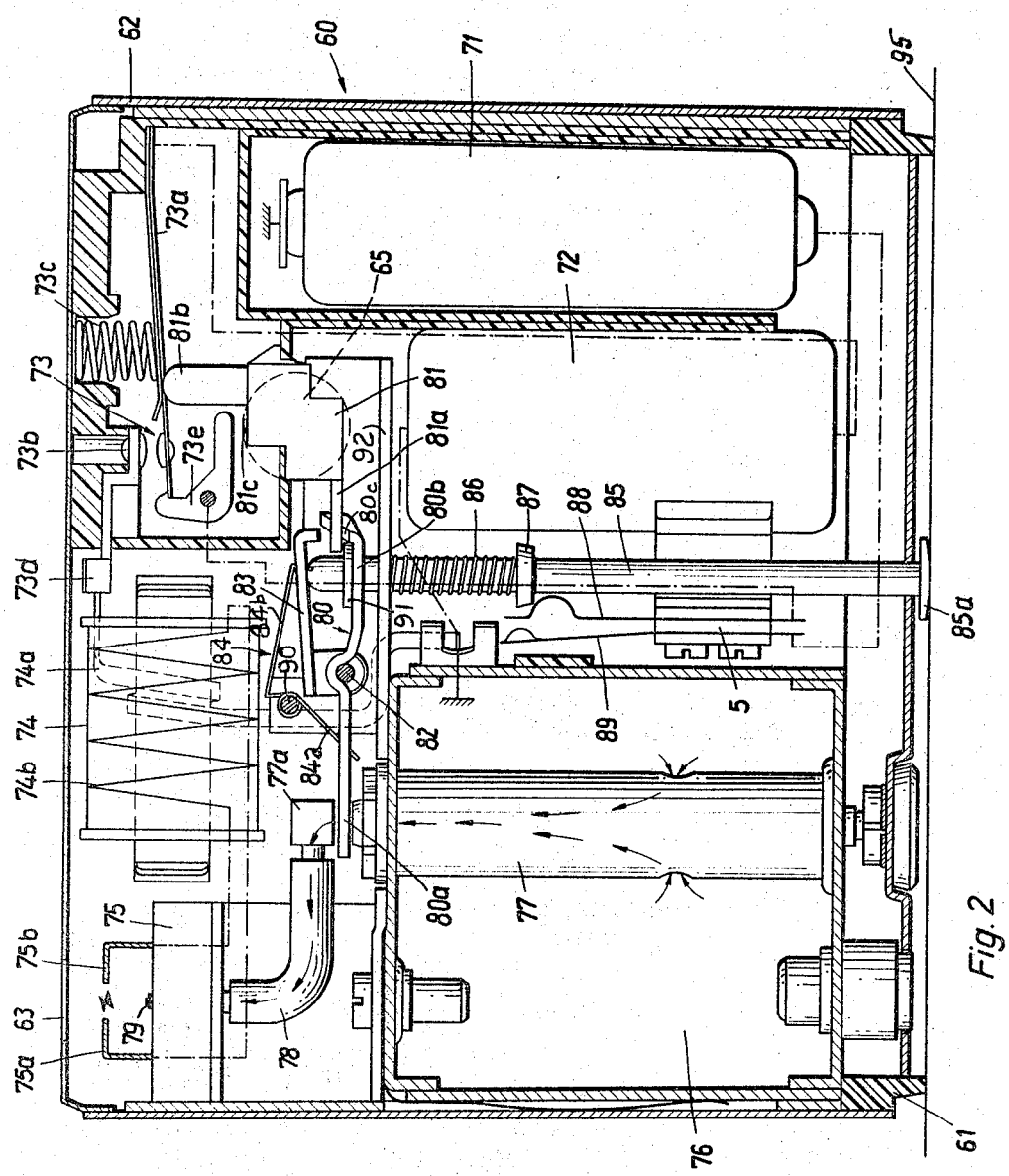

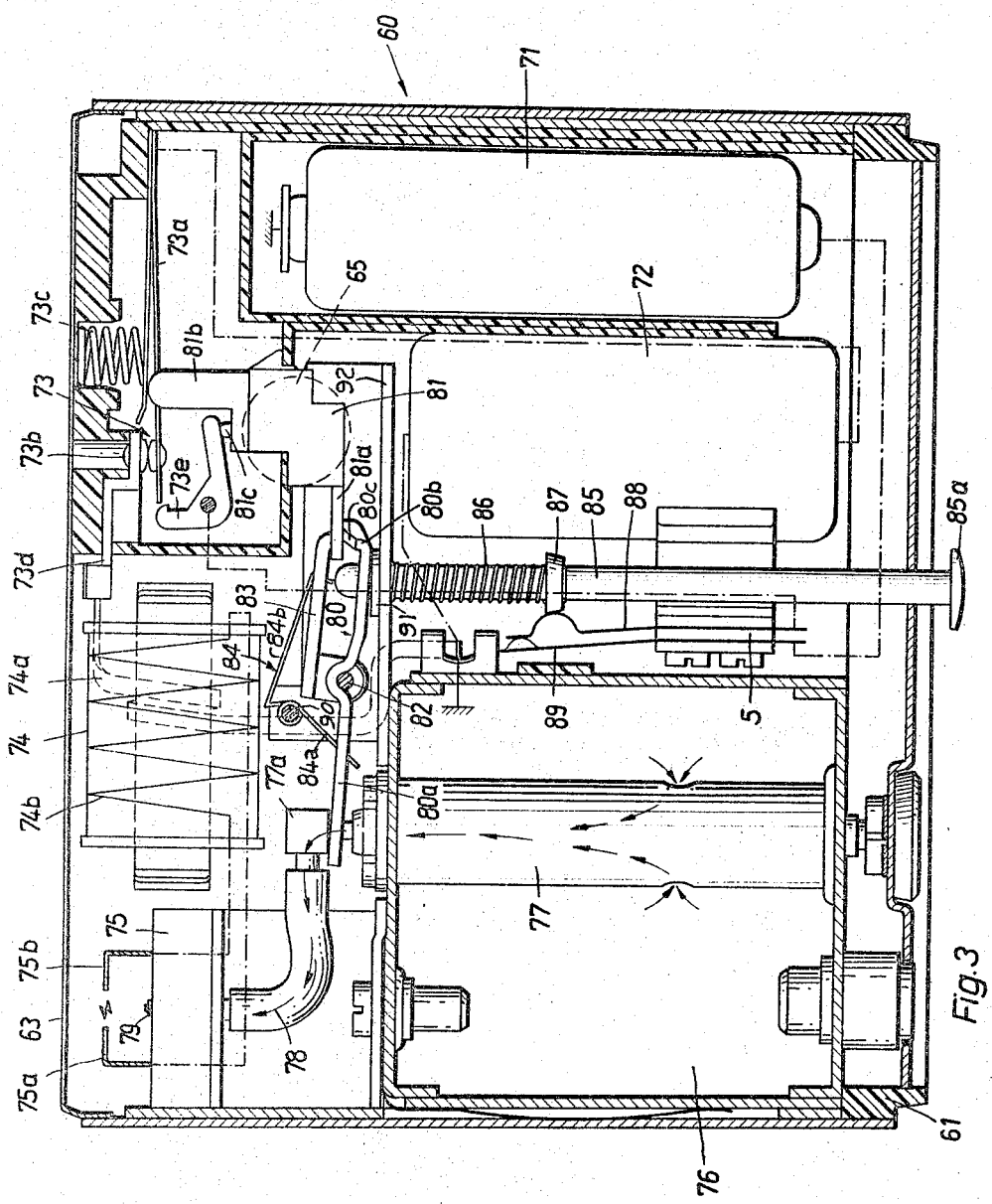

Inventors:
HERMANN REMY
HANS-JÜRGEN BERGHAUS
OTTO ADLER
MARTIN GRÜNBACHER
BY: Hane and Nydick
ATTORNEYS

United States Patent Office 3,319,129
Patented May 9, 1967

3,319,129
ELECTRICALLY IGNITED LIGHTER
Hermann Remy, Dietzenbach-Steinberg, and Hans-Jürgen Berghaus and Otto Adler, Heusenstamm near Offenbach am Main, and Martin Grünbacher, Offenbach am Main, Germany, assignors to Rowenta Metallwarenfabrik G.m.b.H., Offenbach am Main, Germany
Filed Aug. 23, 1966, Ser. No. 574,464
5 Claims. (Cl. 317—86)

ABSTRACT OF THE DISCLOSURE

The invention relates to a gas-fueled lighter, the fuel of which is ignited by a spark discharge.

The invention resides in a lighter of this kind in which the actuation of an operating member such as a knob closes the charging circuit for a capacitor which supplies the required voltage for a spark discharge; opens the fuel valve of the lighter to permit discharge of fuel in gaseous form and connects the terminals of the capacitor across electrodes to effect the spark discharge for igniting the flow of fuel.

---

The invention relates to a lighter of the type used by smokers for lighting cigarettes, cigars and pipes, and more particularly to a gas-fueled electrically ignited lighter. The invention is especially suitable for, but not limited to, table lighters.

The present invention is a continuation-in-part application based upon co-pending application Ser. No. 271,700 filed Apr. 9, 1963, now abandoned. The application discloses but does not claim certain subject matter disclosed and claimed in copending application Ser. No. 576,776 filed Aug. 30, 1966.

Several attempts have been made to develop an ignition system for gas-fueled electrically ignited lighters of the general kind above referred to by providing a voltage source to generate a spark discharge which in turn is used to ignite a gaseous fuel, such as butane. However, these attempts were not successful in practice. Due to the rather high voltage required to generate a spark discharge sufficient to ignite a flow of gasified fuel, a battery capable of supplying such voltage becomes too large and too heavy to be practical, or is rapidly drained.

It is an object of the invention to provide a novel and improved gas-fueled electrically ignited lighter of the general kind above referred to in the ignition system of which produces a fully adequate spark discharge by means of a small and long-lasting battery, such as a so-called hearing aid battery having a voltage output of 22.5 volts.

A more specific object of the invention is to provide a novel and improved gas-fueled electrically ignited lighter the ignition system of which drains current from the battery only when such current is actually needed, so that the battery has a very long useful life.

It is also an object of the invention to provide a novel and improved gas-fueled electrically ignited lighter the actuating means of which when operated opens a fuel discharge valve to release a flow of gasified fuel and also initiates a spark discharge igniting the released flow of fuel.

A more specific object of the invention is to provide a novel and improved gas-fueled electrically ignited lighter in which the opening of the fuel release valve and the initiation of the spark discharge are so correlated that the release of the flow of fuel slightly precedes the spark discharge, thereby assuring that combustible gas is actually present when the spark discharge occurs.

Another more specific object of the invention is to provide a novel and improved gas-fueled electrically ignited lighter in which the fuel valve locks itself in its open position so that the flame persists as long as it is desired by the user of the lighter, and is releasable by the user whenever desired, thereby extinguishing the flame. Release of the fuel valve for return into its closed position may be effected by simply placing the lighter upon a support.

Other and further objects, features and advantages of the invention will be pointed out hereinafter and set forth in the appended claims constituting part of the application.

In the accompanying drawing, a now preferred embodiment of the invention is shown by way of illustration, and not by way of limitation.

In the drawing:

FIG. 2 is an elevational sectional view of the lighter according to FIG. 1 on an enlarged scale, the casing of the lighter being removed and the mechanism of the lighter being shown in its inactive position;

FIG. 3 is a sectional view similar to FIG. 2, but showing the lighter mechanism in an operated condition;

Figure 1:
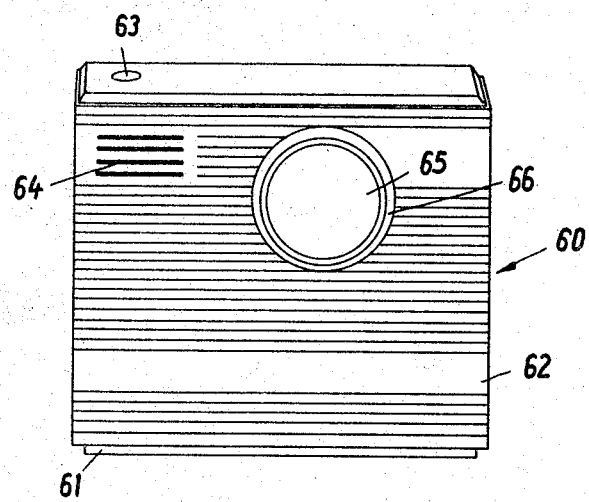
FIG. 1 is a side view of a table lighter according to the invention.
Figure 6:
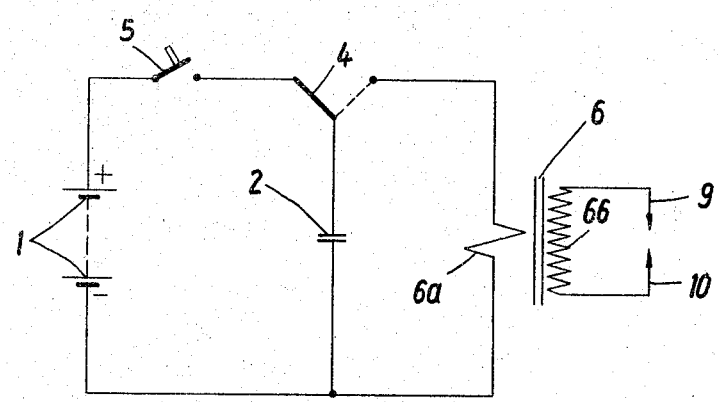
FIG. 6 is a circuit diagram of the lighter.

Referring now to the figures in detail, and first to FIG. 6, the circuit diagram of this figure shows a charging circuit including, serially connected, a source of voltage 1, such as a battery of the hearing aid type, for instance, a conventional 22.5 volt hearing aid battery, and a capacitor 22. The diagram further shows a discharge circuit including the primary winding 6a of a step-up transformer 6. The secondary winding 6b of the transformer has terminals 9 and 10 defining a spark gap therebetween. The primary winding is connectable by a switch 4 across the terminals of capacitor 2. The switch is common to the charging circuit and the discharging circuit. It has a movable switch arm which, when placed in the full-line position, closes the charging circuit so that the capacitor is charged by battery 1 (disregarding for the time being switch 5), and when placed in the dotted-line position closes the discharge circuit through primary winding 6a so that the capacitor will discharge through this winding.

As is evident from the diagram, the capacitor will be continuously charged by the battery when switch 4 is in the full-line position (disregarding switch 5). As is also evident, placement of the switch into the dotted-line position induces a stepped-up voltage in secondary winding 6b which will cause a spark discharge across the terminal electrodes 9 and 10. This spark discharge is utilized to ignite a flow of combustible gas, as will be more fully explained hereinafter.

A normally closed charging circuit for capacitor 2 entails a continuous drain on battery 1 due to the inherent and unavoidable leakage loss at capacitor 2. To avoid such leakage loss, a normally open switch 5 is included in the charging circuit. This switch is closed only when and while it is necessary to charge the capacitor for the purpose of using the lighter.

As has been previously indicated, one of the problems with lighters of the kind here involved is that they must be comparatively small and light, and that accordingly, the available electric energy must be utilized to the fullest extent. A switch such as switch 4, when moved by hand into the dotted-line position of FIG. 6, may or may not be rapidly placed in a position in which it is fully closed, that is, in a position in which the contact resistance between the contacts of the switch is at a minimum. There may also be a certain bounce-back between the switch contacts. The result of such imperfect closing of the switch is that the energy stored in the charged capacitor is not fully discharged through winding 6a, thereby correspondingly weakening or even preventing the spark discharge and thus rendering uncertain the ignition of the gas flow. It has been found advantageous to effect placement of switch 4 in its discharge position by a directional force, such as a spring, which snaps the switch when released into its discharge position and retains the switch in said position, thereby assuring a substantially complete and uninterrupted discharge of the capacitor through winding 6a.

Turning now to FIGS. 1 to 5, the entire mechanism of the lighter is encased in a casing 60 of suitable design. The casing has two parts, namely, a chassis or base part 61 and a cover part 62 telescoped upon the chassis. The casing is completely closed except for a flame opening 63 and louvers 64.

Operation of the lighter, in a manner which will be more fully described hereinafter, is effected by means of a button 65 fitted in a suitable opening 66 of the casing and operable from the outside of the casing by exerting a temporary pressure upon the button against the action of a return spring 65a.

The entire mechanism of the lighter, with the exception of button 65, is supported by chassis 61 and comprises a battery 71, a capacitor 72, and a switch 73 including a switch spring 73a, a stationary switch contact 73b and a coil spring 73c urging the switch spring 73a into the position of FIG. 2, in which the switch spring is disengaged from switch contact 73b. Switch contact 73b is supported by a conducting member 73d. Switch spring 73a is retainable by a spring-loaded pawl 73e, as will be more fully explained hereinafter.

The mechanism also comprises a transformer 74 having a primary winding 74a and a secondary winding 74b corresponding to transformer 6 and its windings as shown in FIG. 6. Battery 71, capacitor 72, switch 73 and the windings of transformer 74 are connected as has been explained in connection with FIG. 6. The secondary winding 4b of the transformer is connected to two electrodes 75a and 75b defining a spark gap therebetween. The two electrodes are suitably mounted on a support 75.

Figure 4:
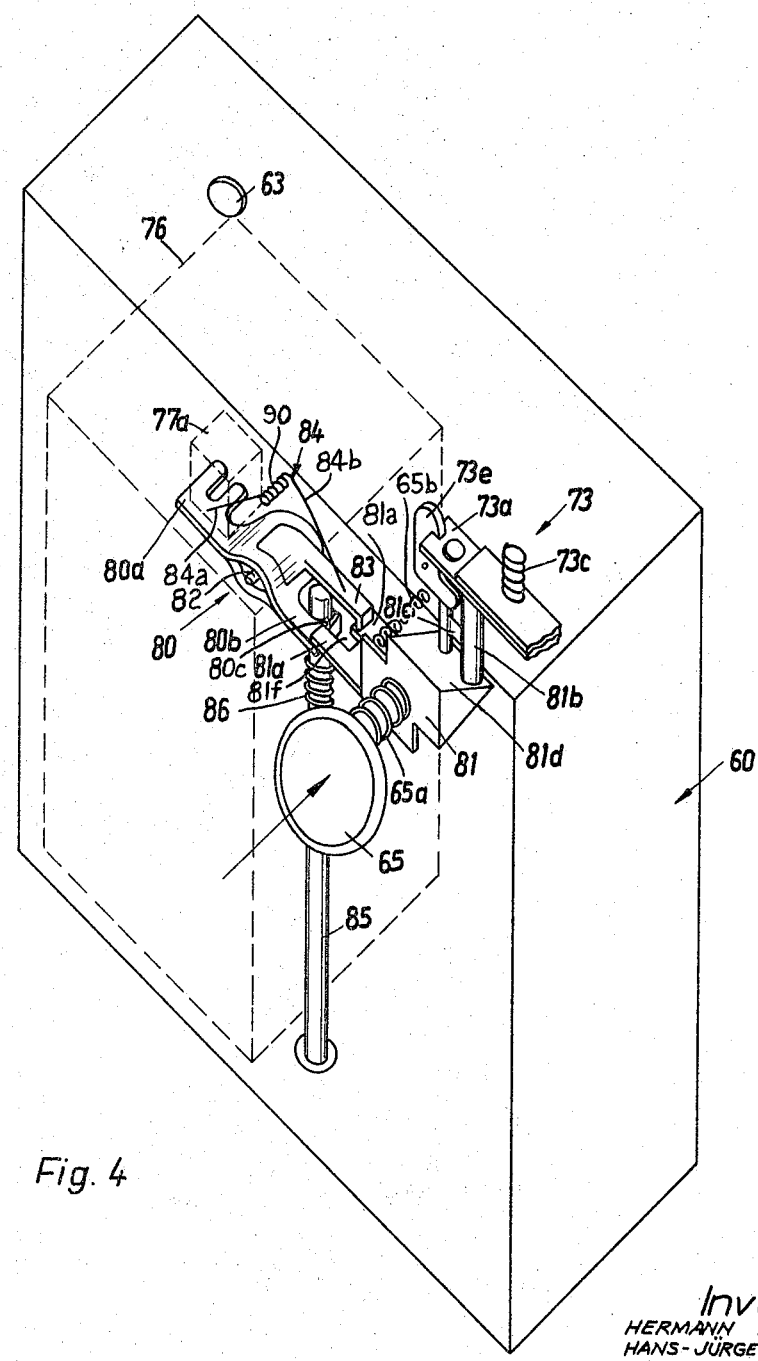
FIG. 4 is a perspective view of the actuating means of the lighter for actuating a circuit switch and the fuel valve on an enlarged scale.
Figure 5:
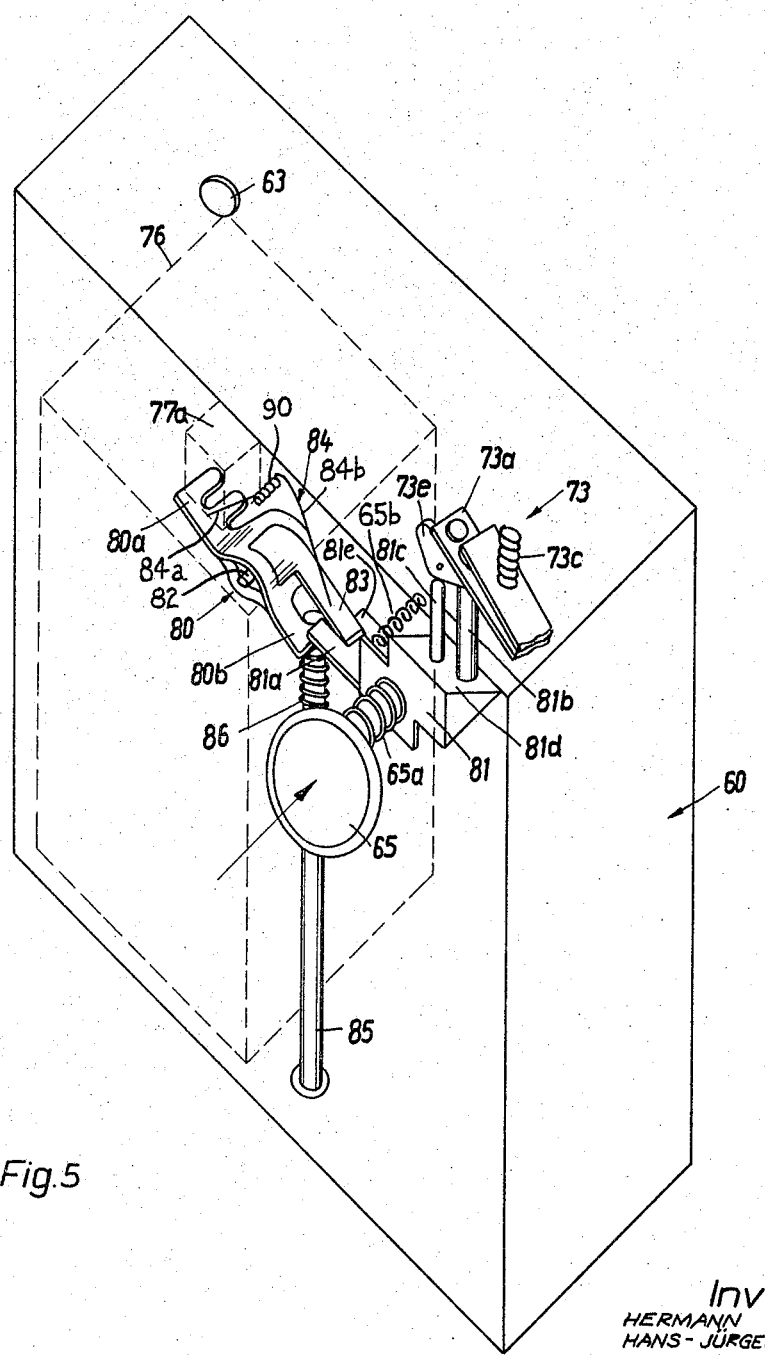
FIG. 5 is a perspective view similar to FIG. 4, but showing the respective components in a different operational position.

The mechanism of the lighter further includes a fuel tank 76 in which a suitable fuel, such as butane, is stored in liquefied form. The fuel is fed in gasified form through a fuel valve 77 including a valve control head 77a and a pipe 78 to a fuel discharge nozzle 79 which is so placed that a stream of fuel discharged therefrom will pass between electrodes 75a and 75b. The valve control head 77a is normally biased into a valve-closing position, but may be opened by the action of one arm 80a of a lever 80, the other arm 80b of which coacts with an arm 81a of a movable member 81, which in turn is actuated by button 65. Member 81 by means of a slanted surface 81d operates a stem 81b coacting with switch spring 73a and also a further stem 81c coacting with one arm of pawl 73e. Lever 80 is pivotal on a pin 82, which also pivotally supports an arm 83. A spring 84 supported by a pin 90 abuts with one arm 84a against arm 81a to bias lever 81 in counterclockwise direction and with a second arm 84b against arm 83 to bias the same in clockwise direction. Such turning of arm 83 is limited by an extension 81e which is separated from arm 81a by a gap 81f. Lever arm 80b terminates in a slanted surface 80c which is engaged with arm 81a for a purpose which will be more fully explained hereinafter. The coaction of lever 80 and member 81 and the actuation of switch 73 by member 81 are clearly shown in FIGS. 4 and 5. FIG. 4 shows button 65 in its rest position, and FIG. 5 in its pressed-in position to actuate member 81 and lever 80.

Arm 83 is further engageable with the upper end of a bar 85 which is downwardly biased by a spring 86. The downward movement of the bar is limited by a washer 91 abutting against chassis wall 92. The bar also mounts a collar 87, which in turn coacts with a contact spring 88 biased out of engagement with a contact spring 89, contact springs 88 and 89 constituting a switch corresponding to normally open switch 5 of FIG. 6. The other end of bar 85 protrudes from the base of chassis 61 and may terminate in an enlarged head 85a.

The operation of the lighter as hereinbefore described is as follows:

As stated before, FIG. 2 shows the lighter in its inactive or non-operated position. It is assumed that the lighter rests upon a suitable surface, indicated at 95, such as a table top, and as a result, bar 85 is pressed upwardly against the action of spring 86. Accordingly, the fuel control head 77a is closed, as lever 80 does not act upon it. Contact spring 73a is held in the disengaged position by pawl 73e, that is, switch 73 is in the position shown in FIG. 6 in full lines for switch 4. However, capacitor 72 is not being charged, since switch 88, 89, corresponding to switch 5 of FIG. 6, is also open. In other words, the circuit connections of the lighter in FIG. 2 are functionally identical with the circuit connections shown in FIG. 6.

Let it now be assumed that it is desired to use the lighter. To this end, the user lifts the lighter. Accordingly, the pressure against bar head 85a is relieved, and bar 85 is moved downwardly from the position shown in FIG. 2 into the position shown in FIG. 3 by the action of spring 86. As a result, switch 88, 89 is closed by the engagement of collar 87 with contact spring 88, and the capacitor 72 is being charged, thereby readying the lighter for use. When now the user presses button 65 temporarily toward the casing, member 81 is moved from the position of FIG. 2 into the position of FIG. 3, or from the position of FIG. 4 into the position of FIG. 5. As a result of such movement, stem 81c is lifted and turns pawl 73e from the latching position of FIG. 2 into the release position of FIG. 3. Stem 81b is also lifted and moves contact spring 73a into engagement with contact 73b against the action of spring 73c. Arm 81a of member 81 turns lever 80 from the position of FIG. 2 into the position of FIG. 3, or from the position of FIG. 4 into the position of FIG. 5, against the action of spring arm 84a by riding up on slanted surface 80c, thereby causing lifting of valve control head 77a and thus opening of the fuel valve so that a flow of fuel begins to escape from nozzle 79. The fuel valve is latched in its open position by engagement of arm 83 with gap 81f. As previously described, the latching movement of arm 83 is effected by the clockwise rotation of arm 83 by the action of spring arm 84b.

Closing of switch 73 closes the discharge circuit, or in other words, it corresponds functionally to a movement of switch 4 from the full-line position of FIG. 6 into the dotted-line position, and as a result, a spark discharge occurs, causing ignition of the fuel.

As previously stated, it is desirable that the fuel valve be opened shortly before the discharge circuit is actuated so that an adequate flow of gaseous fuel will be present between electrodes 75a and 75b before the spark discharge occurs. For this purpose the turning of pawl 73e is so arranged that contact spring 73a is released by pawl 73e only after stem 81b has moved contact spring 73a through a predetermined distance toward the stationary switch contact 73b against the action of spring 73c. Accordingly, the closing of the discharge circuit is slightly delayed in reference to the opening of the fuel valve.

All the components of the lighter mechanism are now in the position of FIG. 3 and remain in this position as long as no upward pressure is exerted upon bar 85. Accordingly, the fuel valve remains open so that the flame persists, and the charging circuit for the capacitor 72 remains closed at switch 73 as long as the user presses upon button 65.

To extinguish the flame and to return all the components of the mechanism into the position of FIG. 2, the user of the lighter must exert an upward pressure upon bar 85. Such upward pressure can be applied either by directly pressing against head portion 85a of the bar, or more conveniently, by placing the lighter upon a surface, such as surface 95. As is evident, upward pressure upon bar 85 displaces the same so that collar 87 releases contact spring 88 whereby switch 88, 89 (corresponding to switch 5 of FIG. 6) is reopened. The bar will exert upward pressure upon arm 83 so that the arm is forced out of the gap 81f between arm 81a and extension 81e. Member 81 is now free to be returned from the position of FIG. 5 into the position of FIG. 4 by the action of a return spring 65b. The return movement of member 81 causes arm 81a to ride down on slant 80c, thereby freeing lever 80 for pivotal movement into the fuel valve-closing position by the action of spring arm 84a. Moreover, contact spring 73c is now moved into its position disengaged from switch contact 73b by the action of spring 73c and is latched in this position by re-engagement with pawl 73e. In other words, the lighter of FIGS. 2 and 3 is again in the condition shown in FIG. 6 with respect to its circuit connections. As is evident from the previous description, switch 73 and fuel valve 77 are simultaneously actuated for closing of the switch and the valve, respectively, by pressing upon button 65, but return independently into the rest positions. The switch is opened immediately upon release of the button, that is, before member 81 has reached the rest position according to FIG. 4.

While this invention has been described in detail with respect to a certain now preferred example and embodiment thereof, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An electrically ignited gas-fueled lighter comprising, in combination: a fuel tank; a normally closed fuel valve for discharging a flow of fuel from said tank upon opening of the valve; a valve-actuating means coacting with said valve for opening the same; an ignition system comprising a charging circuit including a source of D.C. voltage and a capacitance means connected in parallel, a discharge circuit including the primary winding of a step-up transformer having a primary winding and a secondary winding, said primary winding being connected across the terminals of said capacitance means and said secondary winding having terminals defining a spark gap therebetween, said spark gap being disposed in a flow of fuel discharged by said valve in its open position, and a switch means common to said charging circuit and said discharging circuit, said switching means having a switch arm movable between a charging position closing said charging circuit for charging the capacitance means, and a discharge position closing said discharge circuit for discharging said capacitance means through said primary winding, said discharge of the capacitance means inducing a voltage in the secondary winding causing a spark discharge across said spark gap; and operating means coacting with said valve-actuating means to operate the same for opening said fuel valve to release a flow of fuel therefrom and with said switch means to move said switch arm into the position closing said discharge circuit, thereby causing ignition of the flow of fuel by the spark discharged across said spark gap.

2. A lighter according to claim 1 and comprising latch means locking said fuel valve in its open position, and release means for releasing said latch means.

3. A lighter according to claim 1 and comprising normally open second switch means included in said charging circuit, actuating means for closing said second switch means to effect closing of the charging circuit and thus charging of said capacitance means when said movable switch arm is in its charging position.

4. A lighter according to claim 1 and comprising releasable latch means locking said fuel valve in its open position, a second switch means included in said charging circuit, yieldable means biasing said second switch means into the open position, switch-operating means for moving the second switch means into the closed position and retaining the second switch means in said position against the action of the yieldable means, and common actuating means coacting with said latch means and said switch-operating means for releasing the latch means to effect return of the fuel valve into its closed position upon operation of said common actuating means.

5. A lighter according to claim 1, wherein said operating means comprise timing means correlating the opening of the fuel valve and movement of the switch arm into its position closing the discharge circuit so that the opening of the valve slightly precedes the closing of the discharge circuit by the switch arm, whereby a flow of fuel is released prior to the moment the spark discharge occurs.

References Cited by the Examiner

UNITED STATES PATENTS

| | | | |
|---|---|---|---|
| 1,895,032 | 1/1933 | Fisher | 317—87 X |
| 2,275,861 | 3/1942 | Miess | 317—83 |
| 2,482,794 | 9/1949 | Peterson | 67—7 |
| 2,644,117 | 6/1953 | Schmitt et al. | 317—80 |

FOREIGN PATENTS 1,183,510  1/1959  France.

RICHARD M. WOOD, *Primary Examiner.*

V. Y. MAYEWSKY, *Assistant Examiner.*

UNITED STATES PATENT OFFICE
CERTIFICATE OF CORRECTION

Patent No. 3,319,129                                          May 9, 1967

Hermann Remy et al.

It is hereby certified that error appears in the above numbered patent requiring correction and that the said Letters Patent should read as corrected below.

Column 5, line 50, for "parallel" read -- series --.

Signed and sealed this 7th day of January 1969.

(SEAL)
Attest:

Edward M. Fletcher, Jr.

Attesting Officer

EDWARD J. BRENNER

Commissioner of Patents